United States Patent
Lee

(10) Patent No.: US 10,506,796 B1
(45) Date of Patent: Dec. 17, 2019

(54) CLAW CLIPPER WITH LED FOR COMPANION ANIMAL

(71) Applicant: Bo Ra Lee, Gwangju (KR)

(72) Inventor: Bo Ra Lee, Gwangju (KR)

( * ) Notice: Subject to any disclaimer, the term of this patent is extended or adjusted under 35 U.S.C. 154(b) by 0 days.

(21) Appl. No.: 16/408,441

(22) Filed: May 9, 2019

(30) Foreign Application Priority Data

Nov. 8, 2018 (KR) .......................... 10-2018-0136307
Dec. 27, 2018 (KR) .......................... 10-2018-0170277

(51) Int. Cl.
*A01K 17/00* (2006.01)
*A45D 29/02* (2006.01)

(52) U.S. Cl.
CPC .............. *A01K 17/00* (2013.01); *A45D 29/02* (2013.01)

(58) Field of Classification Search
CPC ......... A01K 13/00; A01K 17/00; A45D 29/02
USPC .......................... 119/600, 601, 610; 132/73.5
See application file for complete search history.

(56) References Cited

U.S. PATENT DOCUMENTS

| | | | | |
|---|---|---|---|---|
| 3,845,553 A * | 11/1974 | Fields | ................ | A01K 17/00 30/29 |
| 6,220,251 B1 * | 4/2001 | Jeong | ................ | A45D 29/04 132/73.5 |
| 7,000,321 B1 * | 2/2006 | Rodgers | ................ | A01K 13/00 119/600 |
| 7,131,448 B2 * | 11/2006 | Lund | ................ | A45D 29/02 132/73.5 |
| 7,137,356 B2 * | 11/2006 | Huggans | ................ | A01K 13/00 119/601 |
| 7,217,001 B2 * | 5/2007 | Vrsalovic | ................ | A01K 13/00 132/73.5 |
| 7,263,775 B2 * | 9/2007 | Moulton, III | ................ | A01K 13/00 119/600 |
| 7,464,665 B1 * | 12/2008 | Rogers | ................ | A01K 13/00 119/600 |
| 8,096,305 B1 * | 1/2012 | Cheney | ................ | A45D 29/18 132/73.5 |
| 8,100,088 B2 * | 1/2012 | Manheimer, III | ................ | A01K 13/00 119/600 |
| 8,496,013 B2 * | 7/2013 | McCourtney | ................ | A45D 29/22 132/73.5 |
| 8,667,691 B2 * | 3/2014 | Gibbs | ................ | A45D 29/02 132/73.5 |
| 9,913,457 B2 * | 3/2018 | Kim | ................ | A01K 17/00 |
| 9,913,522 B1 * | 3/2018 | Greenstone | ................ | A45D 29/02 |
| 2006/0042559 A1 * | 3/2006 | Kang | ................ | A01K 13/00 119/600 |
| 2006/0158871 A1 * | 7/2006 | Hopkins | ................ | A01K 13/00 362/119 |
| 2007/0277378 A1 * | 12/2007 | Kabella | ................ | A01K 13/00 30/29 |
| 2016/0044896 A1 * | 2/2016 | Bo | ................ | A01K 17/00 362/119 |

FOREIGN PATENT DOCUMENTS

KR    20-0376975 Y1    3/2005

* cited by examiner

*Primary Examiner* — Yvonne R Abbott-Lewis
(74) *Attorney, Agent, or Firm* — Revolution IP, PLLC

(57) ABSTRACT

A claw clipper with an LED for a companion animal, includes: a pair of handles connected to each other by an elastic member; a pair of clipper blades each attached to a first side of an end portion of each of the handles, respectively; and an LED module provided in a first surface of the end portion of one of the pair of handles and emitting light in a direction toward the clipper blades.

10 Claims, 7 Drawing Sheets

CLAW CLIPPER WITH LED FOR COMPANION ANIMAL

CROSS REFERENCE TO RELATED APPLICATION

The present application claims priority to Korean Patent Application No. 10-2018-0136307, filed Nov. 8, 2018, and No. 10-2018-0170277, filed Dec. 27, 2018, the entire contents of which is incorporated herein for all purposes by this reference.

BACKGROUND OF THE INVENTION

Field of the Invention

The present invention relates generally to a claw clipper with an LED for a companion animal. More particularly, the present invention relates to a claw clipper with an LED for a companion animal, the clipper being configured to cut claws except for a portion including blood vessels by allowing a user to identify the blood vessels inside the claws of a companion animal through the LED emitting the light in a direction of a cutting blade, and to smoothly trim sharp claw surfaces immediately after being cut as the user rotates a polishing part provided at a surface of a handle of the clipper.

Description of the Related Art

Generally, when claws of a companion animal are longer than a certain level, there is danger that a person may be hurt by a companion animal, so the claws are periodically cut with scissors or claw clippers.

A claw clipper for a companion animal according to the related art includes a pair of upper and lower plates wherein rear ends thereof are coupled to each other so that front ends are elastically opened, and the front ends are provided with cutting parts, a locking pin that is rotatably and vertically inserted into holes provided at the front ends of the upper and lower plates, and a pressing lever engaging with a groove provided at an upper end of the locking pin and functioning as a lever.

Accordingly, when cutting the claws of the companion animal, when a user inserts the claws between the upper and lower plates, and presses the pressing lever, the claws are cut as much as the length inserted into the plates by the cutting parts while the upper and lower plates cross each other.

However, since the user cuts the claws with measurement by eye, positions of blood vessels or nerves inside the claws cannot be identified, and bleeding may occur by accidentally cutting the blood vessels or nerves inside the claws, which are problems of the conventional claw clipper for the companion animal.

In addition, the conventional claw clipper for the companion animal does not have a polishing part for smoothly trimming sharp surfaces of the claws immediately after being cut, so the user may be hurt by the sharp surfaces of the claws of the companion animal.

Documents of Related Art (Patent Document 1) Korean Utility Model Registration No. 20-0376975.

SUMMARY OF THE INVENTION

Accordingly, The present invention has been made keeping in mind the above problems occurring in the related art, and the present invention is intended to propose a claw clipper with an LED for a companion animal, the clippers being provided with an LED emitting light so as to allow a user to identify the blood vessels inside the claws, thereby cutting claws except for a portion including blood vessels.

In addition, the present invention is intended to propose a claw clipper with an LED for a companion animal, the clipper having a polishing part at a surface of a handle of the clipper, thus allowing a user to smoothly trim sharp surfaces of claws immediately after being cut by rotating the polishing part.

In order to accomplish the above object, the present invention provides a claw clipper 10 with an LED for a companion animal includes: a pair of handles 100 connected to each other by an elastic member 110; a pair of clipper blades 200 each attached to a first side of an end portion of each of the handles 100, respectively; and an LED module 300 provided in a first surface of the end portion of one of the pair of handles 100 and emitting light in a direction toward the clipper blades 200.

At a center portion of one of the pair of handles 100, a protrusion 120 protruding toward a remaining one of the handles 100 may be provided, and at a center portion of the remaining one of handles 100, a recess 130 may be provided corresponding to the protrusion 120.

The protrusion 120 may be provided with an engaging groove 121, and the recess 130 may be provided with an engaging protrusion 131 at a position corresponding to a position of the engaging groove 121, wherein the engaging protrusion 131 may be fitted into the engaging groove 121.

At a second side of an end portion of one of the pair of handles 100, an extension portion 140 extending toward a remaining one of the handles 100 may be provided, wherein the extension portion 140 may be provided with a locking groove 141, thereby engaging with a locking protrusion 142 provided at a second side of an end portion of the remaining one of the handles 100.

Each of clipper blades 200 may preferably include a concave-shaped insertion groove 210 at a side of a surface at which the clipper blades 200 are in contact with each other.

The LED module 300 may preferably include: an LED light source 310 emitting light in the direction toward the clipper blade 200; a protrusion member 320 protruding from a first side of the LED light source 310; and a body member 330 provided at the first surface of the end portion of one of the pair of handles 100 and having a hollow cylindrical shape, wherein the protrusion member 320 may be inserted in the body member 330.

The protrusion member 320 may preferably include a plurality of locking grooves 321 provided at an outer circumference of the protrusion member 320 in a direction parallel to a central axis thereof.

The body member 330 may preferably include a plurality of locking bumps 331 protruding from an inner circumferential surface thereof with a shape corresponding to a shape of each of the locking grooves 321.

The locking bumps 331 may be formed of an elastic material, and when the protrusion member 320 is inserted into the body member 330 and fitted into the locking grooves 321, by allowing the protrusion member 320 to be rotated only when a force more than a certain amount is applied to the locking grooves 321 against the elasticity of the locking bumps 331, the LED light source 310 may be preferably adjusted to a desired angle.

In addition, the claw clipper 10 with the LED for a companion animal of the present invention may further include: a polishing part 400 provided in the first surface of the end portion of one of the pair of handles 100 and trimming companion animal's claws, wherein the polishing part 400 may include: a polishing member 410 having a rotational shaft 411; and a rotational shaft supporting member 420 for supporting the rotational shaft 411, wherein a hole 412 may be provided at a first side surface of the polishing member 410, and the hole 412 may be preferably provided with an abrasive 413.

In addition, the claw clipper 10 with the LED for a companion animal of the present invention may further include: a claw containing part 500 provided at the first surface of one of the pair of handles 100, wherein the claw containing part 500 may include: a containing member 511 provided at an first surface of an end portion of one of the pair of handles 100, being open in one direction, and having an interior space; and an opening and closing member 510 provided at a first side of the containing member 511 to be rotatable on the axis of the protrusion member 320 so as to cover an open portion of the containing member 511.

The opening and closing member 510 may include: an arbor hole 510a formed into a tubular shape into which the protrusion member 320 is inserted; and a knob 510b extending from an upper part of the arbor hole 510a toward a side of an outer circumferential surface thereof.

According to the present invention, the claw clipper with the LED for a companion animal allows a user to identify the blood vessels inside the claws by using the LED emitting the light in a direction toward blades, so that the claws can be cut except for the part including the blood vessels, thus safe trimming is possible without damaging the blood vessels inside the claws of a companion animal.

In addition, according to the present invention, the user can rotate the polishing part provided at the surface of the handle, thereby smoothly trimming the sharp surfaces of the claws immediately after being cut. Therefore, in addition to preventing people from being hurt by the sharp claws of a companion animal, a companion animal is prevented from damaging things with its sharp claws.

In addition, according to the present invention, since the user can trim the claws immediately after cutting the claws, the user does not need to have separate trimmers in addition to the claw clipper of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
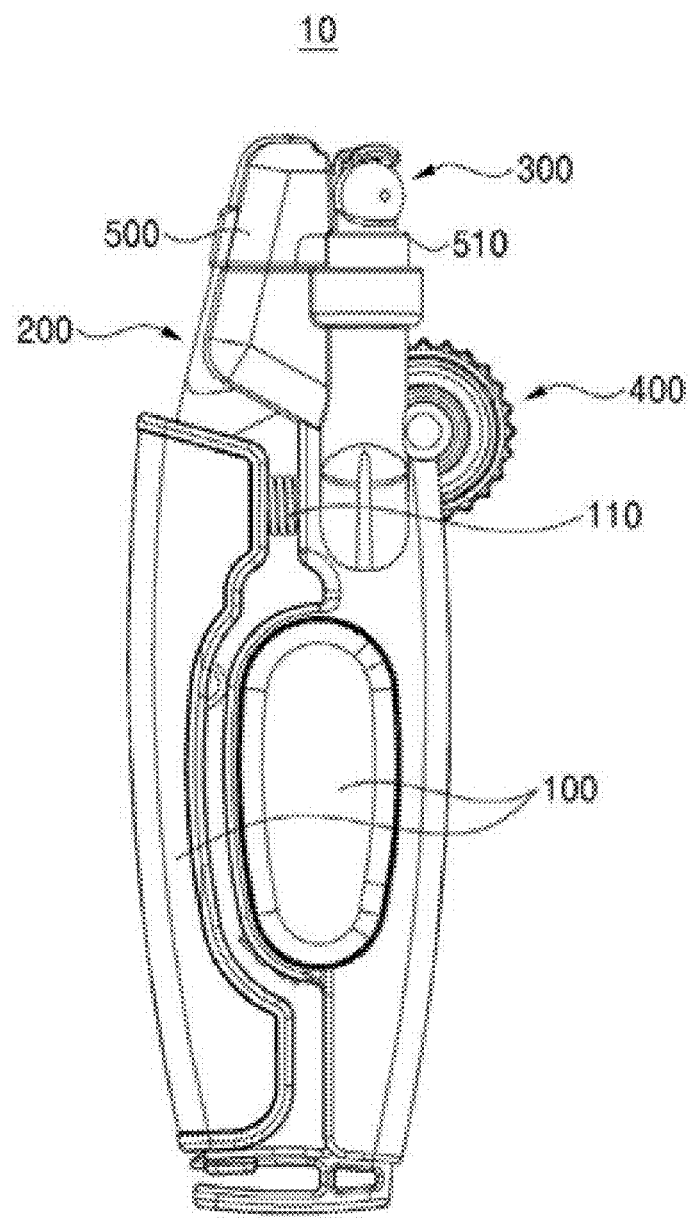
FIG. 1 is a front view of a claw clipper with an LED for a companion animal according to an exemplary embodiment of the present invention.

Hereinbelow, preferred embodiments of the present invention will be described with reference to the accompanying drawings. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, if a member is referred to as being formed "on" another member, it should be understood that a member is in contact with another component. Further, another member may be placed between the two members.

Unless the context clearly indicates otherwise, it will be further understood that the terms "comprises", "comprising", "includes", and/or "including" when used herein specify the presence of stated features, integers, steps, operations, elements, and/or components, but do not preclude the presence or addition of one or more other features, integers, steps, operations, elements, components, and/or groups thereof.

Terms such as "first" and "second" may be used for explaining various constitutive elements, but the constitutive elements should not be limited to these terms. These terms is used only for the purpose for distinguishing a constitutive element from other constitutive element. For example, a first constitutive element may be referred as a second constitutive element, and the second constitutive element may be also referred to as the first constitutive element.

Hereinbelow, a claw clipper with an LED for a companion animal according to the present invention will be described in detail with reference to the accompanying drawings. In the accompanying drawings, the shapes and sizes of elements may be exaggerated or simplified for explicit and convenient description, so that modifications are anticipated when the elements are actually embodied. Accordingly, the embodiments of the present invention should not be construed as limitations to specific shapes illustrated in the drawings.

FIG. 1 is a front view of the claw clipper with the LED for a companion animal according to an exemplary embodiment of the present invention.

Referring to FIG. 1, the claw clipper 10 with the LED for a companion animal of the present invention includes a pair of handles 100, a pair of clipper blades 200, and an LED module 300.

Figure 5:
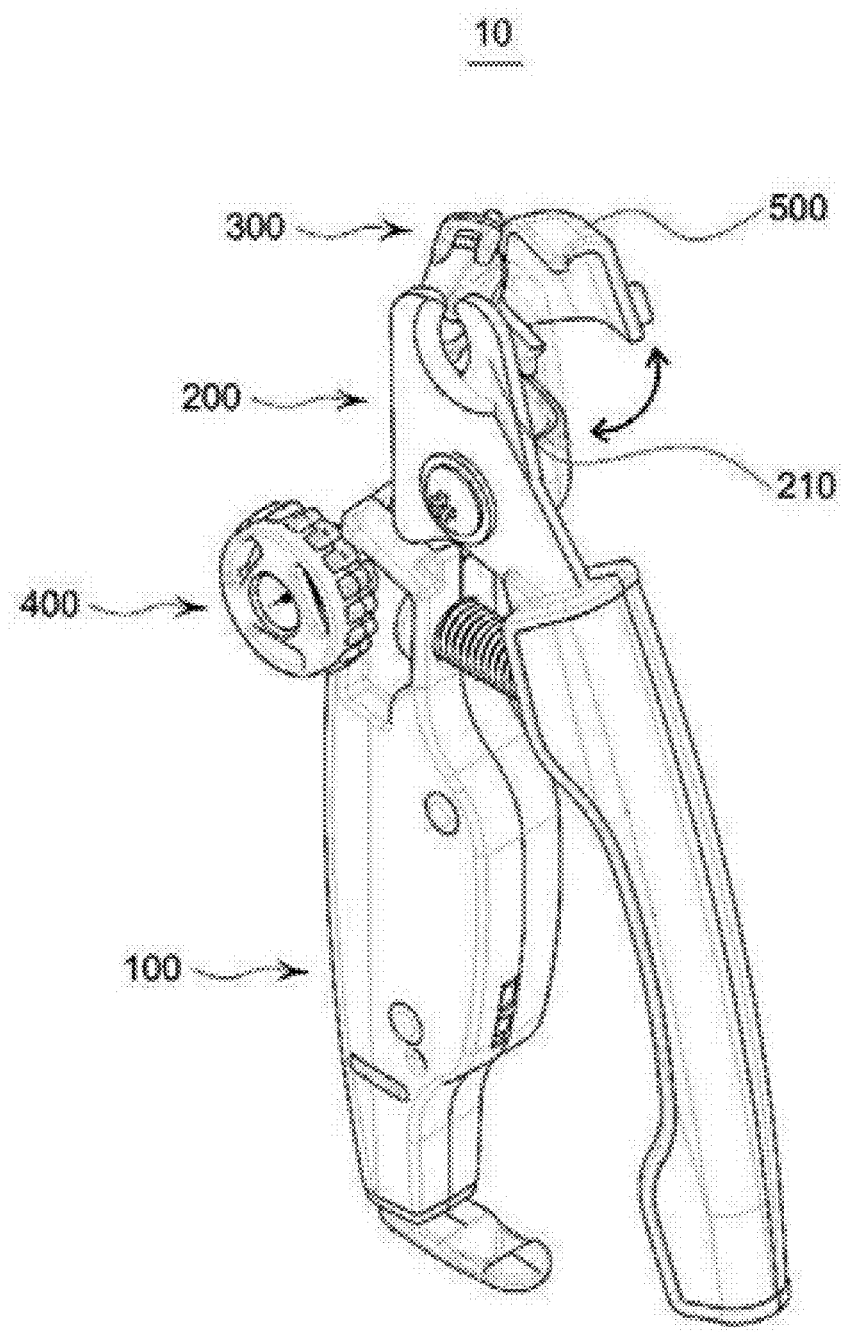
FIG. 5 is a perspective view of the claw clipper with the LED for a companion animal according to the exemplary embodiment of the prevent invention, the claw clipper being in an opened state.

The pair of handles 100 is connected to each other by an elastic member 110, a clipper blades 200 are attached to a first side of an end portion of each of handles 100, respectively. The pair of handles 100 is gripped by a user, the user pressurizes the handles 100 (referring to FIG. 5) that are opened elastically by the elastic member 110 to allow the clipper blades 200 to contact each other, thereby cutting claws of a companion animal.

In addition, the LED module 300 and a polishing part 400 are provided at a first surface of an end portion of one of the pair of handles 100. The LED module 300 and the polishing part 400 may be preferably provided at both surfaces of the end portion of one of the pair of handles 100, but the positions thereof are not limited to the above description, the LED module 300 is provided at the first surface of the end portion of one of the pair of handles 100, and the polishing part 400 may be provided at a second surface of an end portion of the other handles 100.

The pair of clipper blades 200 is attached to the first side of the end portion of each of the handles 100. The pair of clipper blades 200 functions to cut the claws of a companion animal by crossing each other due to the pressure applied to the handles 100.

The LED module 300 is provided at the first surface of the end portion of one of the pair of handles 100. As the light is irradiated in a direction toward the clipper blade 200, the LED module 300 allows the user to identify blood vessels inside the claws of a companion animal with the naked eye.

The LED module 300 is preferably provided at a position as close to the clipper blade 200 as possible. Therefore, the LED module 300 may emit the light while being positioned as close to the claws of a companion animal as possible so that the user can precisely identify the veins inside the claws of the companion animal with the naked eye.

The polishing part 400 is provided at the first surface of the end portion of one of the pair of handles 100, and the polishing part 400 may be rotated by the user to smoothly trim sharp claw surfaces immediately after being cut.

The claw clipper 10 with the LED for a companion animal of the present invention may further include a claw containing part 500 at a surface of one of the pair of clipper blades 200.

That is, the claw containing part 500 is provided with an interior space thereby containing claw pieces of the companion animal cut by the clipper blades 200. Thus, it is possible to prevent the claw pieces from flying in several directions during cutting the claws.

The claw containing part 500 is preferably made of transparent materials, such as polyethylene terephthalate (PET), poly propylene (PP), polystyrene (PS), silicone rubber, and etc., so that the user can cut the claws of the companion animal while looking at the clipper blade 200.

In addition, a containing member 511 having a hollow cylindrical shape is provided at one side of the claw containing part 500. By inserting the LED module 300 (that is, a protrusion member 320 of FIG. 3) into the containing member 511, the claw containing part 500 may be attached to the surface of one of the pair of clipper blades 200. After using the claw clipper, the containing member 511 and the LED module 300 are separated from each other to discharge the claws contained in the interior space to the outside.

Figure 2:
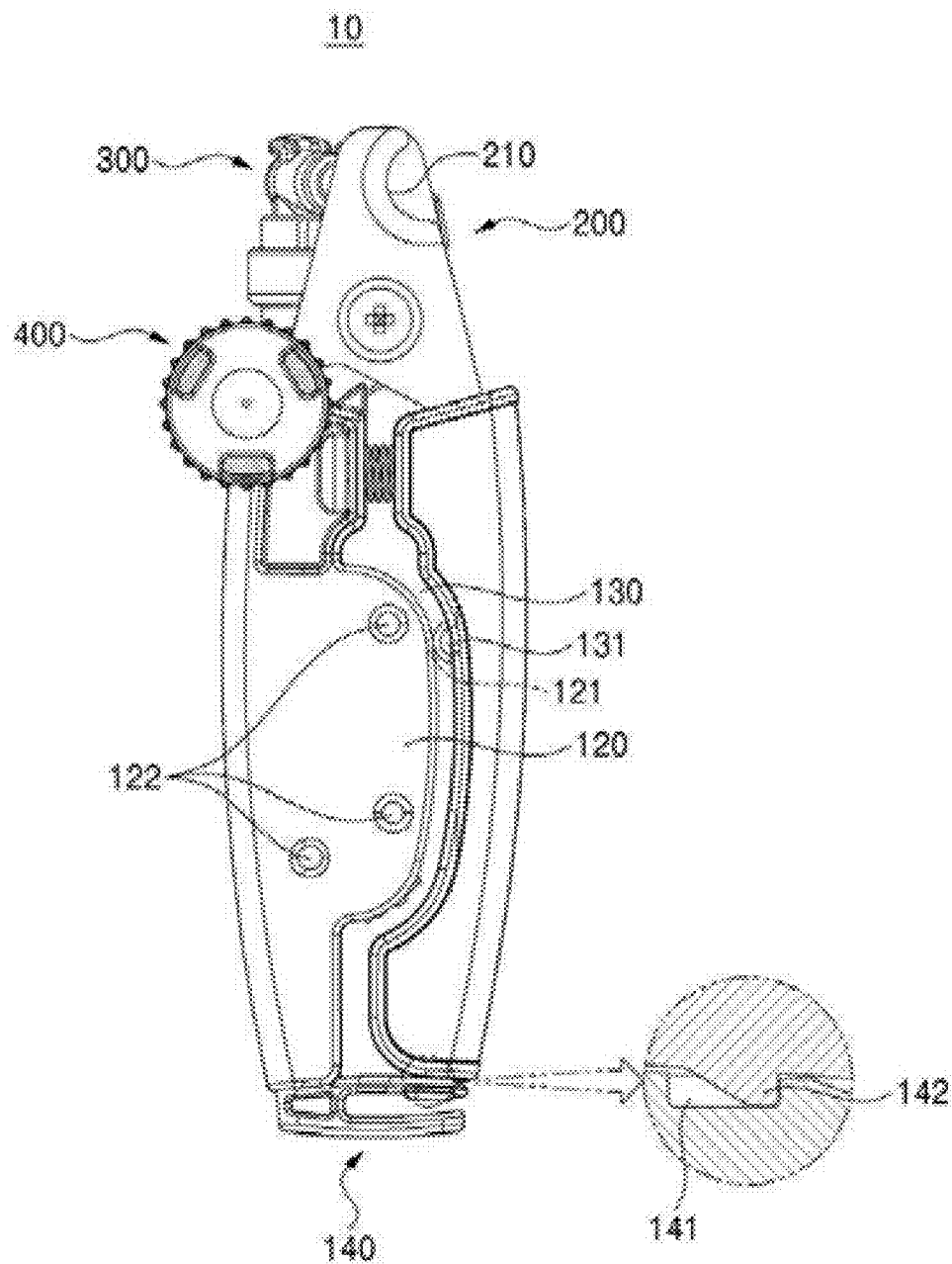
FIG. 2 is a rear view of the claw clipper with the LED for a companion animal according to the exemplary embodiment of the prevent invention.

FIG. 2 is a rear view of the claw clipper with the LED for a companion animal according to the exemplary embodiment of the prevent invention.

Referring to FIG. 2, at the center of one of the pair of handles 100, a protrusion 120 that protrudes toward the other handle 100 is provided. In addition, at the center of the other handle 100, a recess 130 for corresponding to the protrusion 120 is provided so that the protrusion 120 is received in the recess 130.

The protrusion 120 widens a contact area of the hand palm of the user with the handles 100. Thus, the user can prevent the hand from slipping from the handles 100 when the user grips the pair of handles 100 and applies a force.

Accordingly, it is preferable that the protrusion 120 is formed of a material that is soft and adherable such as silicone. As shown in FIG. 2, a plurality of bumps 122 is further provided at a surface of the protrusion 120 so as to additionally prevent the hand of the user from slipping.

Meanwhile, the protrusion 120 is provided with an engaging groove 121, and the recess 130 is provided with an engaging protrusion 131 at a position corresponding to a position of the engaging groove 121. Thus, the engaging protrusion 131 may be fitted into the engaging groove 121.

That is, when the claw clipper 10 with the LED for a companion animal is stored after use thereof, the pair of handles 100 is closed, and then the engaging protrusion 131 is fitted into the engaging groove 121 to be held.

In addition, at a second side of an end portion of one of the pair of handles 100, an extension portion 140 extending toward the other handle 100 is provided. In addition, at the extension portion 140, a locking groove 141 is provided and may be engaged with a locking protrusion 142 that is provided at a second side of an end portion of the other handle 100.

As described above, since the pair of handles 100 is fastened to each other with the locking groove 141 and the locking protrusion 142, blade parts of the pair of clipper blades 200 are held in contact with each other so as not to be exposed to the outside, thus the claw clipper 10 with the LED for a companion animal may be safely stored.

In addition, as shown in FIG. 2, the pair of clipper blades 200 each includes a concave-shaped insertion groove 210 at a side of a surface at which the clipper blades 200 are in contact with each other. Thus, the user can insert the claws of a companion animal into the insertion groove 210 and apply the force to the handles 100 to cut the claws.

Figure 3:
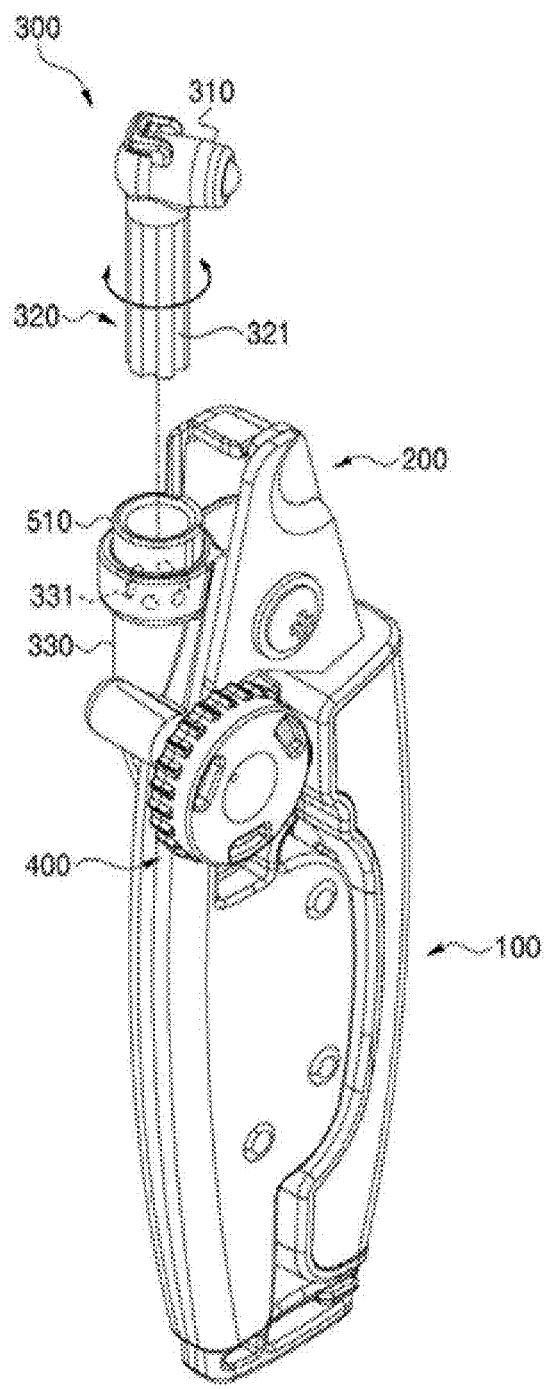
FIG. 3 is an exploded-perspective view showing an LED module according to the exemplary embodiment of the present invention.

FIG. 3 is an exploded-perspective view showing the LED module according to the exemplary embodiment of the present invention.

Referring to FIG. 3, the LED module 300 includes an LED light source 310, the protrusion member 320, and a body member 330.

The LED light source 310 has the protrusion member 320 at a side thereof, and emits the light toward the clipper blade 200 to irradiate the claws of a companion animal. Accordingly, the user can identify the blood vessels inside the claws of a companion animal with the naked eye.

The LED light source 310 may be electrically connected to a battery (not shown) provided inside the protrusion member 320, and include a switch (not shown) that may be pushed by the hand, preferably, include a toggle switch, thereby receiving electricity from the battery by operating the switch ON and OFF.

In addition, the LED light source 310 is preferably provided with a white LED so that the user can identify the blood vessels inside the claws of a companion animal with the naked eye, but the LED light source 310 is not limited thereto, it may be provided with LEDs of RGB colors or a light source of laser.

The protrusion member 320 protrudes from the side of the LED light source 310, and is inserted into the body member 330, thus the LED light source 310 emits the light toward the clipper blade 200 thereby irradiating the claws of a companion animal with the light.

Specifically, since the protrusion member 320 is inserted into the containing member 511 and then inserted into the body member 330, the claw containing part 500 may be attached to the surface of one of the pair of clipper blades 200.

The body member 330 is provided at the first surface of the end portion of one of the pair of handles 100, has a hollow cylindrical shape, and accommodates the protrusion member 320 therein to hold the LED light source 310 so that the LED light source 310 irradiates the claws of a companion animal with the light.

Meanwhile, the protrusion member 320 may further include a plurality of locking grooves 321 formed around an outer circumference surface in a direction parallel to a central axis of the protrusion member 320. The body member 330 may include a plurality of locking bumps 331 at an inner circumference, the bumps 331 protruding with a shape corresponding to the locking grooves 321.

Here, the locking bumps 331 are preferably formed of a material having elasticity. That is, when the protrusion member 320 is inserted into the body member 330 and the locking bumps 331 is fitted into the locking grooves 321, by allowing the protrusion member 320 to be rotated only when a force more than a certain amount is applied to the locking grooves 321 against the elasticity of the locking bumps 331, the user can control and hold the LED light source 310 to the desired angle.

That is, after the LED light source 310 is held at an optimum angle so that the blood vessels inside the claws of a companion animal may be identified with the naked eye, the claws may be cut except for a part including the blood vessels, and damage to the blood vessels inside the claws of a companion animal can be prevented.

In addition, the LED module 300 is configured such that the protrusion member 320 is removed from the body member 330. Accordingly, when the battery of the LED light source 310 is flat or is damaged by external pressure, the LED module 300 may be replaced with new LED module 300.

Figure 4:
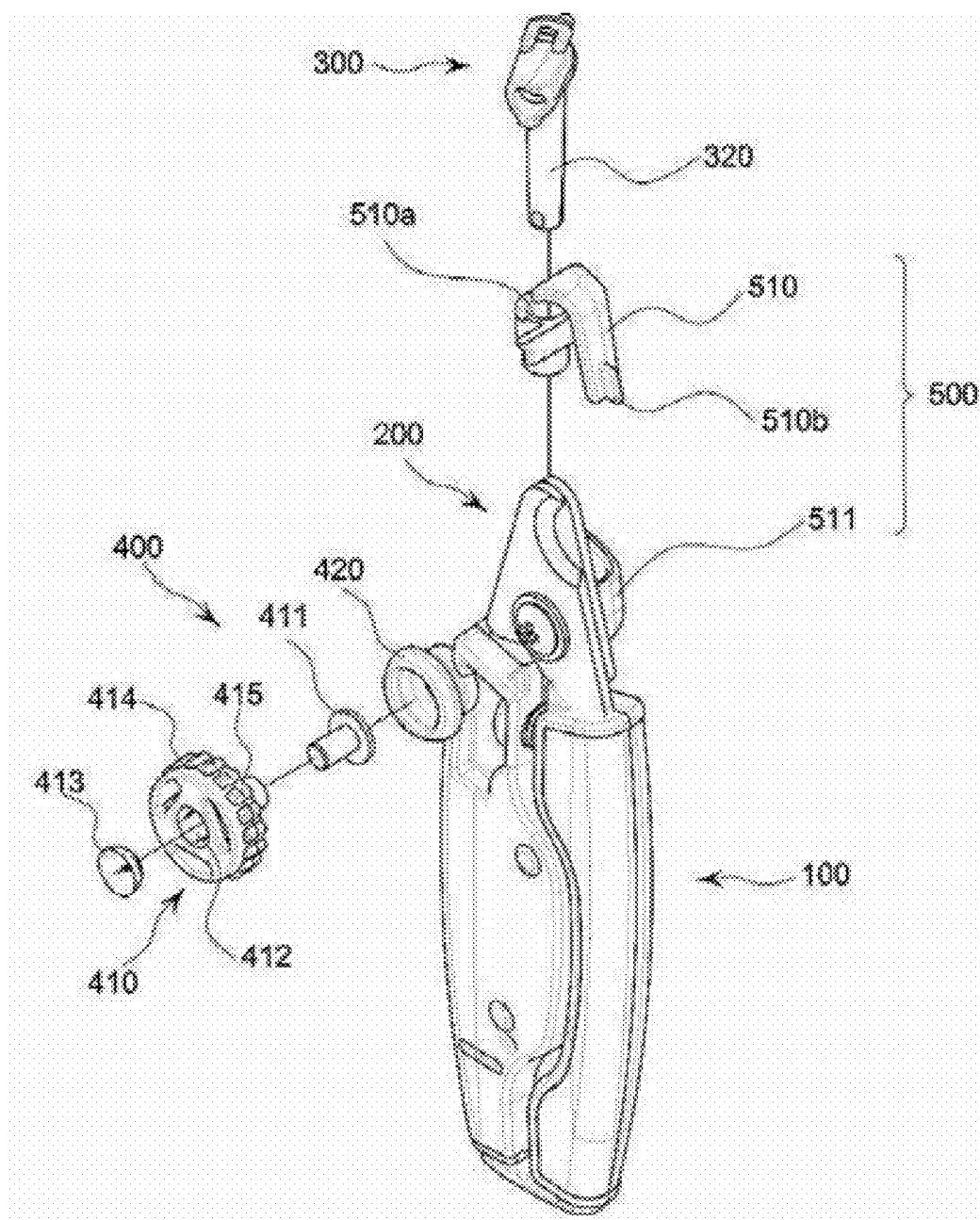
FIG. 4 is an exploded-perspective view showing a polishing part according to the exemplary embodiment of the present invention.

FIG. 4 is an exploded-perspective view showing a polishing part according to the exemplary embodiment of the present invention.

Referring to FIG. 4, the polishing part 400 includes a polishing member 410 and a rotational shaft supporting member 420. While a claw surface is in close contact with an abrasive 413 attached to a hole 412 of the polishing member 410, the polishing member 410 is rotated and smoothly polish the sharp claw surface immediately after being cut.

The polishing member 410 has a circular shape, and has a rotational shaft 411 at a first surface so that it may be rotated by the user. The rotational shaft 411 is supported by the rotational shaft supporting member 420.

At a second surface of the polishing member 410, the hole 412 to which the abrasive 413 is attached is provided. The user can closely put the claw surface of a companion animal into the hole 412 and then smoothly trim the claw surface by rotating the polishing member 410.

The abrasive 413 may be made of materials such as sandpaper, diamond chips, cement, stone power, and cubic boron nitride (CBN) to trim the sharp claw surfaces, but any material that may polish the claws of a companion animal may be used.

In addition, these materials may also be spread directly to the hole 412, attached by an adhesive, or engaged by known methods, such as an interference fitting method or a method using bumps and a method using a fastener including a screw.

In addition, the polishing member 410 has a saw-toothed shape and has valleys 414 and peeks 415 at an outer circumference so that the user can easily rotate the polishing member 410.

That is, when the outer circumference of the polishing member 410 is rotated while the sharp claw surface immediately after being cut is in close contact with the hole 412 of the polishing member 410, the sharp claw surface is smoothly polished due to a frictional force that occurs on the claw surface being contact with the abrasive 413. Accordingly, in addition to preventing people from being hurt by the sharp claws of a companion animal, a companion animal is also prevented from damaging things.

Meanwhile, the rotational shaft supporting member 420 is provided at the second surface of the end portion of one of the pair of handles 100, and supports the rotational shaft 411 of the polishing member 410.

The rotational shaft supporting member 420 is preferably provided as close as possible to the clipper blade 200 so that the claws of a companion animal may be polished immediately after being cut.

The polishing part 400 is configured to be removably attached to the second surface of the end portion of one of the pair of handles 100. Accordingly, when the abrasive 413 wears or the polishing part 400 is damaged by the outer pressure, the existing polishing part 400 may be placed with new polishing part 400, and the user can alternately use polishing parts 400 including a variety of abrasive materials to trim the claws, thereby quickly and finely trimming the claws.

The claw clipper 10 with the LED for a companion animal according to the present invention can allow the user to identify the blood vessels inside the claws of a companion animal via the LED module 300 emitting the light in the direction toward the clipper blade 200 so that the user can cut the claws except for the portion including the blood vessels. Accordingly, the user can safely cut the claws without damaging the blood vessels inside the claws of a companion animal.

In addition, since the claw clipper of the present invention is configured such that the polishing part 400 provided at a surface of one of the pair of handles 100 may be rotated to smoothly trim the sharp claw surfaces immediately after being cut, in addition to preventing the life from being hurt by the sharp claws of a companion animal, a companion animals is also prevented from damaging things.

In addition, since the claw clipper of the present invention is configured to trim the claws of a companion animal immediately after cutting the claws, the user does not need to have separate trimmers in addition to the claw clipper 10 with the LED for a companion animal, which is advantageous.

Figure 6:
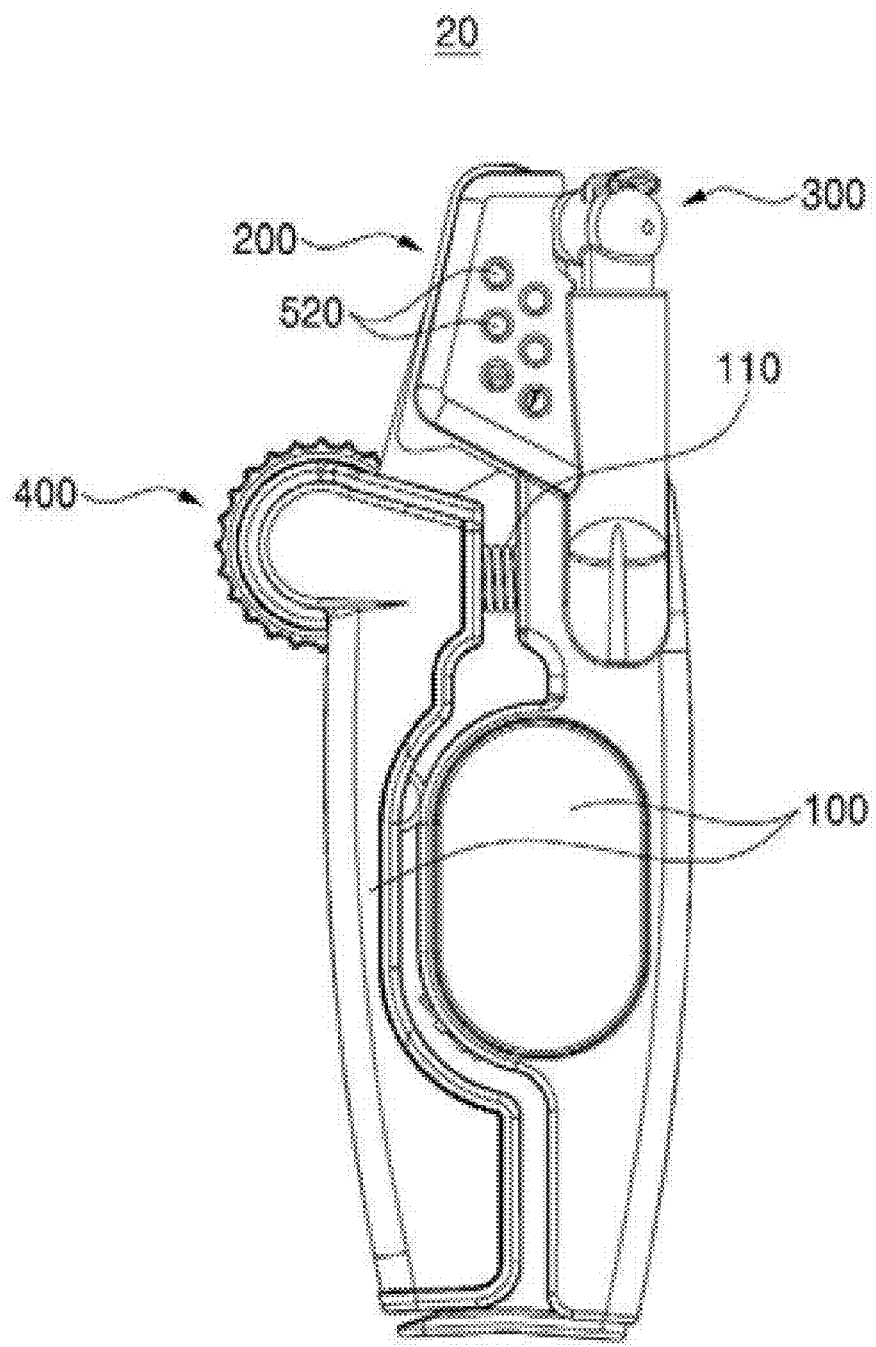
FIG. 6 is a front view of a claw clipper with an LED for a companion animal according to another embodiment of the present invention.

FIG. 6 is a front view of a claw clipper with an LED for a companion animal according to another embodiment of the present invention.

Referring to FIG. 6, the claw clipper 20 with the LED for a companion animal includes a pair of handles 100, a pair of clipper blades 200, a LED module 300, a polishing part 400, and a claw containing part 500. Here, the description of the same parts as those of the precedent embodiment will be omitted, and only the other parts will be described.

As shown in FIG. 6, the claw clipper 20 with the LED for a companion animal is provided with the LED module 300 at a first surface of an end portion of one of the pair of handles 100, and with the polishing part 400 at the second surface of the end portion of the other handle 100.

In addition, the claw containing part 500 is attached to a surface of one of the pair of clipper blades 200 and accommodates the claws cut by the clipper blade 200, thereby preventing the cut claws from flying in several directions during cutting thereof.

The claw containing part 500 includes a containing member 511 that is provided at the first surface of the end portion of one of the pair of handles 100, is open in one direction, and has an interior space, and an opening and closing member 510 that is provided at a side of the containing member 511 with being rotatable on an axis of the protrusion member 320 so as to cover an open portion of the containing member 511.

At an outer surface of the claw containing part 500, a plurality of holes 520 is provided so that the cut claws are contained in the interior space of the containing member 511 may be discharged to the outside via the holes 520.

In addition, the opening and closing member 510 includes an arbor hole 510*a* and a knob 510*b* as shown in FIG. 4.

The arbor hole 510*a* is formed into a tubular shape into which the protrusion member 320 is inserted. That is, the arbor hole 510*a* is provided such that a first side thereof is inserted into the body member 330 and a second side thereof is exposed and into which the protrusion member 320 is inserted.

The arbor hole 510*a* is rotated on a vertical axis of the body member 330, and the protrusion member 320 is rotated on the same axis as the arbor hole 510*a* and the body member 330.

The knob 510*b* extends from an upper part of the arbor hole 510*a* toward a side of an outer circumferential surface thereof, and the knob 510*b* is preferably provided so that the knob 510*b* may be pushed in one direction when the user rotates the arbor hole 510*a* in one direction.

Figure 7:
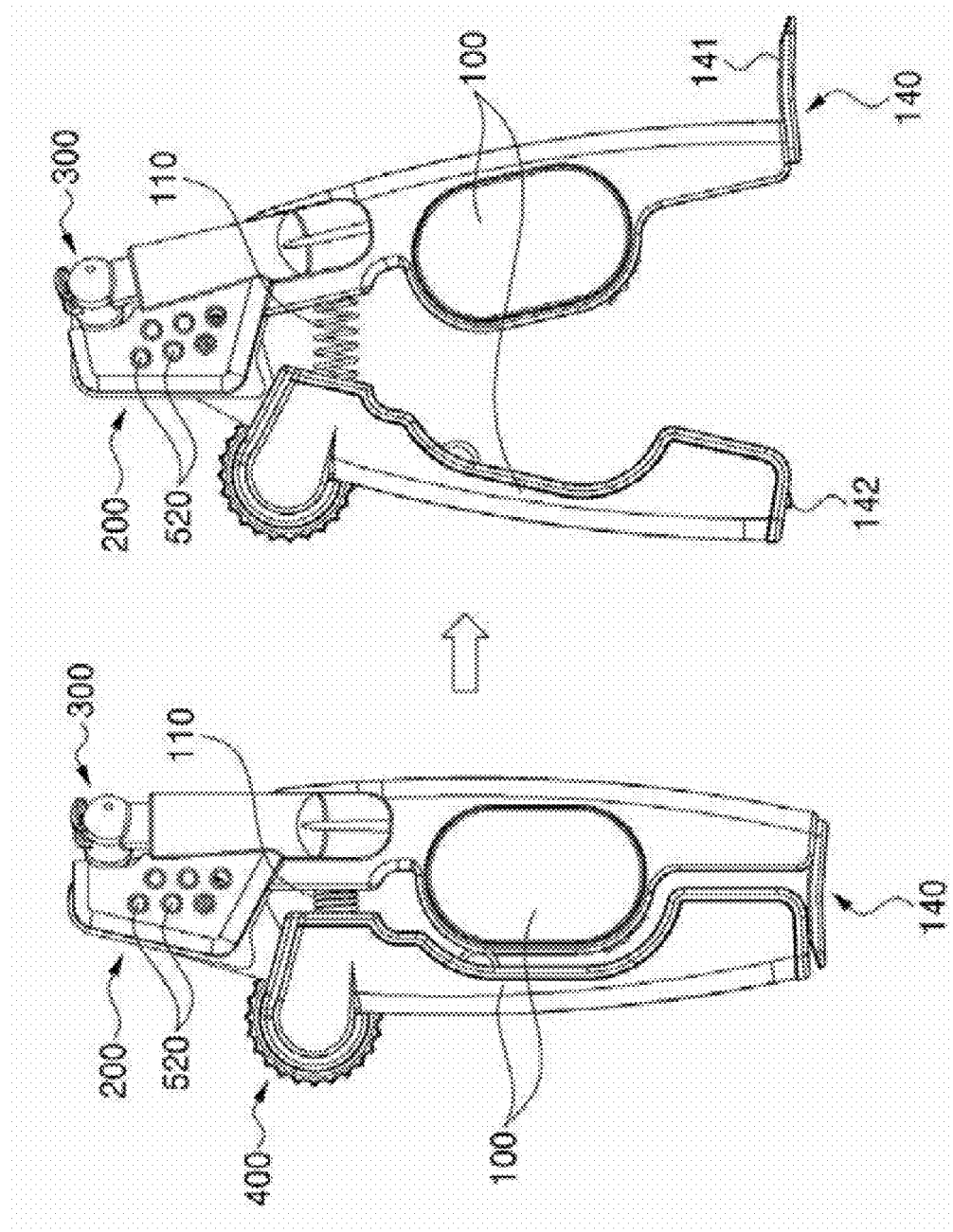
FIG. 7 illustrates the claw clipper with the LED for a companion animal according to the other embodiment of the present invention in respective front views, when the claw clipper is stored and used.

FIG. 7 illustrates the handles 100 of the claw clipper 20 with the LED for a companion animal according to the other embodiment of the present invention in respective front views, when the claw clipper 20 is stored and used. Since an extension portion 140 provided at a lower part of the handle is rotated by an inner rotational shaft (not shown), when the claw clipper 20 is stored without being used, a locking protrusion 142 is locked by a locking groove 141, and when the claw clipper 20 is used, the extension portion 140 is rotated in an opposite direction, thereby preventing the problem that the handles are locked and stopped by the locking groove 141 or the locking protrusion 142 during use.

What is claimed is:

1. A claw clipper with an LED for a companion animal, the claw clipper comprising:
    a pair of handles (100) connected to each other by an elastic member (110);
    a pair of clipper blades (200) each attached to a first side of an end portion of each of the handles (100), respectively; and
    an LED module (300) provided in a first surface of the end portion of one of the pair of handles (100) and emitting light in a direction toward the clipper blades (200),
    wherein, at a center portion of one of the pair of handles (100), a protrusion (120) protruding toward a remaining one of the handles (100) is provided, and at a center portion of the remaining one of handles (100), a recess (130) is provided corresponding to the protrusion (120).

2. The claw clipper with the LED for a companion animal of claim 1, wherein the protrusion (120) is provided with an engaging groove (121), and the recess (130) is provided with an engaging protrusion (131) at a position corresponding to a position of the engaging groove (121), wherein the engaging protrusion (131) is fitted into the engaging groove (121).

3. The claw clipper with the LED for a companion animal of claim 1, wherein at a second side of an end portion of one of the pair of handles (100), an extension portion (140) extending toward a remaining one of the handles (100) is provided,
    wherein the extension portion (140) is provided with a locking groove (141), thereby engaging with a locking protrusion (142) provided at a second side of an end portion of the remaining one of the handles (100).

4. The claw clipper with the LED for a companion animal of claim 1, wherein the LED module (300) comprises:
    an LED light source (310) emitting light in the direction toward the clipper blades (200);
    a protrusion member (320) protruding from a first side of the LED light source (310); and
    a body member (330) provided at the first surface of the end portion of one of the pair of handles (100) and having a hollow cylindrical shape,
    wherein the protrusion member (320) is inserted in the body member (330).

5. The claw clipper with the LED for a companion animal of claim 4, wherein the protrusion member (320) comprises a plurality of locking grooves (321) that is provided at an outer circumference of the protrusion member (320) in a direction parallel to an central axis thereof.

6. The claw clipper with the LED for a companion animal of claim 5, wherein the body member (330) comprises a plurality of locking bumps (331) protruding from an inner circumferential surface thereof with a shape corresponding to a shape of each of the locking grooves (321).

7. The claw clipper with the LED for a companion animal of claim 6, wherein the locking bumps (331) are made of an elastic material, and when the protrusion member (320) is inserted into the body member (330) and fitted into the locking grooves (321), by allowing the protrusion member (320) to be rotated only when a force more than a certain amount is applied to the locking grooves (321) against the elasticity of the locking bumps (331), the LED light source (310) is adjusted to a desired angle.

8. A claw clipper with an LED for a companion animal, the claw clipper comprising:
    a pair of handles (100) connected to each other by an elastic member (110);
    a pair of clipper blades (200) each attached to a first side of an end portion of each of the handles (100), respectively; and
    an LED module (300) provided in a first surface of the end portion of one of the pair of handles (100) and emitting light in a direction toward the clipper blades (200);
    a polishing part (400) provided in the first surface of the end portion of one of the pair of handles (100) and trimming companion animal's claws,
    wherein the polishing part (400) comprises:
    a polishing member (410) having a rotational shaft (411); and
    a rotational shaft supporting member (420) for supporting the rotational shaft (411),
    wherein a hole (412) is provided at a first side surface of the polishing member (410), and the hole (412) is provided with an abrasive (413).

9. A claw clipper with an LED for a companion animal, the claw clipper comprising:
    a pair of handles (100) connected to each other by an elastic member (110);

a pair of clipper blades (200) each attached to a first side of an end portion of each of the handles (100), respectively; and an LED module (300) provided in a first surface of the end portion of one of the pair of handles (100) and emitting light in a direction toward the clipper blades (200);

a claw containing part (500) provided at the first surface of one of the pair of handles (100), wherein the claw containing part (500) comprises:

a containing member (511) provided at an first surface of an end portion of one of the pair of handles (100), being open in one direction, and having an interior space; and an opening and closing member (510) provided at a first side of the containing member (511) to be rotatable on an axis of the protrusion member (320) so as to cover an open portion of the containing member (511).

10. The claw clipper with the LED for a companion animal of claim 9, wherein the opening and closing member (510) comprises:

an arbor hole (510*a*) provided in a tubular shape into which the protrusion member (320) is inserted; and a knob (510*b*) extending from an upper part of the arbor hole (510*a*) toward a side of an outer circumferential surface thereof.

\* \* \* \* \*